US005834727A

United States Patent [19]
Volnhals

[11] Patent Number: 5,834,727

[45] Date of Patent: Nov. 10, 1998

[54] ELECTRIC WELDING DEVICE

[75] Inventor: Robert Volnhals, Ingolstadt, Germany

[73] Assignee: Emhart Inc., Newark, Del.

[21] Appl. No.: 695,339

[22] Filed: Aug. 9, 1996

[30] Foreign Application Priority Data

Aug. 16, 1995 [DE] Germany ........................ 295 13 158.6

[51] Int. Cl.[6] ........................ B23K 9/20

[52] U.S. Cl. ........................ 219/98

[58] Field of Search ........................ 219/98, 99

[56] References Cited

U.S. PATENT DOCUMENTS

| | | | |
|---|---|---|---|
| 4,385,222 | 5/1983 | Hinden | 219/98 |
| 5,426,276 | 6/1995 | Gauger | 219/98 |

FOREIGN PATENT DOCUMENTS

| | | | |
|---|---|---|---|
| 3128775 | 2/1983 | Germany | 219/98 |
| 3739944 | 3/1989 | Germany | 219/98 |

*Primary Examiner*—Clifford C. Shaw
*Attorney, Agent, or Firm*—E. D. Murphy

[57] ABSTRACT

Electric welding device (5) for welding a fastening element (4), in particular a weld stud, on a workpiece with a stud holding means (1) comprising a conveying duct (2) which is connected at one end to a supply duct (3) and holds a fastening element (4) in its other end during the welding process and including a loading pin (6) which is displaceable to and fro along the axis of the longitudinal direction of the conveying duct. The pin has a shank part (13) and a head part (12) which can be brought to bear on a fastening element (4). At least the head part (12) of the loading pin (6) is an electrically insulating surface.

8 Claims, 2 Drawing Sheets

ELECTRIC WELDING DEVICE

BACKGROUND OF THE INVENTION

The invention relates to an electric welding device for welding a fastening element, in particular a weld stud, on a workpiece.

The supply of fastening elements to the welding device is substantially automated. The fastening elements are conveyed pneumatically from a store via a supply line to the welding device. For receiving the fastening element, the welding device has a supply duct which is connected to one end of a conveying duct. The conveying duct is formed in a stud holding means. The stud holding means has, at its free end, several resilient holding tongues for grasping and holding a fastening element.

A loading pin which is displaceable to and for in the longitudinal direction of the conveying duct is provided for the precise positioning of a fastening element in the stud holding means. The loading pin can be brought to rest on the fastening element held by the stud holding means. The loading pin can be displaced to and for in such a way that, in at least one position, it clears the supply duct and the conveying duct for the supply of a fastening element to the stud holding means.

DESCRIPTION OF THE PRIOR ART

Known electrically operated welding devices operate by the stroke ignition method which is an electric arc stud welding method for welding pin-like metallic parts on metal sheets and/or pipes. With the stroke ignition method, the stud is applied to the workpiece and is removed therefrom while forming an arc between the stud and the workpiece. After producing molten regions on the stud and on the workpiece, the stud is reapplied to the workpiece while extinguishing the arc and is held in its position until the melt solidifies. A device which operates by the stroke ignition method is known, for example, from DE 32 91 979 A1. In order to apply the stud to the workpiece and to move it away from it, the stud holding means is held in a displaceable manner. The loading pin rests on the stud during the welding process. The loading pin forms an abutment to prevent the stud from being pushed back into the conveying duct by being pressed or shot into the melt. The loading pin as such is connected to a cylinder-piston unit which can be operated pneumatically.

During the welding process, d.c. currents of several thousand amperes flow through the stud. Since the loading pin rests on the stud, the loading pin is subjected to electrical wear which occurs due to arcing. The wear of the loading pin is dependent on the welding parameters and the stud geometry. A worn loading pin means that exact axial alignment of the stud in the holding means cannot always be guaranteed. A two-part loading pin for a stud welding gun is known from DE 31 28 795. The loading pin has a shank part serving essentially for guidance and a front head part serving to rest on the stud. The head part is detachably connected to the shank part. This two-part design of the loading pin enables the head part to be exchanged after pronounced wear without the shank part having to be exchanged.

It has also been noted that arcing which acts on the conveying ducts wall occurs between loading pin and stud. It can happen that the conveying duct wall melts locally increasing the roughness of the surface of the conveying duct wall. Such melting can obstruct conveyance of a fastening element within the conveying duct to the stud holding means. The loading pin is connected to a pneumatically operated cylinder-piston unit. A seal which surrounds the loading pin is provided to seal the cylinder-piston unit. The seal can be damaged by arcing during the welding process. Damage to the seal makes the pneumatically operated device inoperative.

SUMMARY OF THE INVENTION

On the basis of the foregoing, the objective of the present invention is to develop the known welding device so as to minimize wear caused by strong currents.

According to the invention, this object is achieved by an electric welding device having an insulating surface to prevent current flow between the loading pin and the stud.

The electric welding device according to the invention for welding a fastening element, in particular a weld stud, on a workpiece is distinguished in that it has a loading pin with a head part designed as an electrical insulator. The loading pin is preferably provided with electrical insulation at least on its end face which can be brought into contact with a fastening element. The electrical insulation can be an electrical insulator such as ceramic or plastic. Since the head part is an electrical insulator, the loading is electrically disconnected from the stud. The design according to the invention accordingly ensures that the contact face of the loading pin on the stud maintains its predetermined contour as electrically induced wear to the loading pin does not occur. Furthermore, the reliability of the welding device is increased by the electrical disconnection as, in contrast to the state of the art, the sealing element no longer wears. The repair costs for the welding device are therefore also minimized. The electrical insulation can be designed in the form of a coating on the loading pin.

An embodiment in which the head part is designed in the form of a cap at least partially surrounding the end of the loading pin is preferred. The cap is preferably detachably connected to the loading pin allowing the electrical insulation of the loading pin to be exchanged.

The detachable connection between the cap and the loading pin can be embodied by a screw connection. Such a screw connection is desirable as it produces a reliable connection and allows easy exchange of the cap.

According to a further idea, it is proposed that the cap be positively and/or non-positively connected to the loading pin. This method of connection has the advantage of simplifying production of a loading pin. The cap is preferably made of an electrically nonconductive plastic material, in particular of a glass fiber-reinforced polyamide.

According to a further advantageous idea, it is proposed that the loading pin be produced from an electrically insulating material. A loading pin of this type invariably ensures that no electric wear of the loading pin occurs. The loading pin can have a metallic core which is preferably sheathed with a ceramic material. As the loading pin is only subjected to pressure, the formerly known insulating materials such as ceramics can be used to form the loading pin. It is also possible to provide the loading pin with a metallic core and to coat it with an electrically insulating material.

DESCRIPTION OF THE PREFERRED EMBODIMENT

Figure 1:
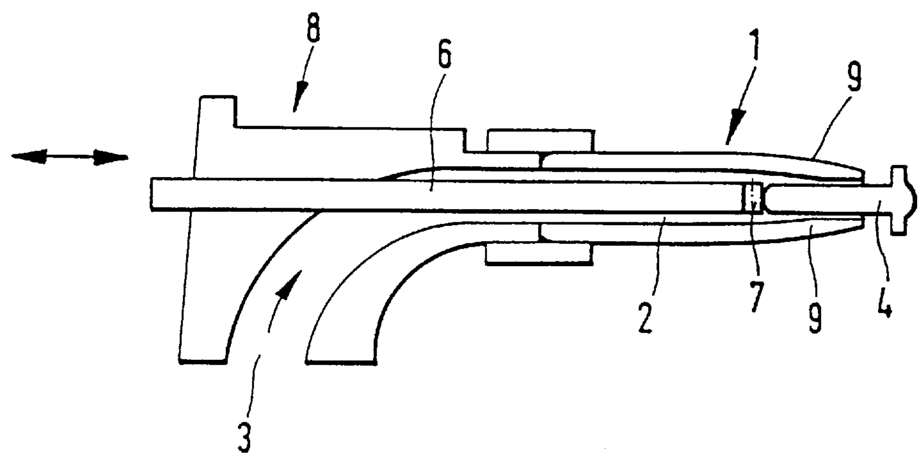
FIG. 1 shows a welding device schematically in cross section.

The welding device shown schematically in FIG. 1 has a housing 8 in which a supply duct 3 is formed. The supply duct 3 has a curved course. The supply duct 3 opens in a conveying duct 2. The conveying duct 2 is formed in a stud holding means 1 connected to the housing 1. The stud holding means 1 has several elastically resilient tongues 9 which hold a stud 4 in their front region. The electrical arrangement belonging to the welding device and the actuating mechanism of the welding device are not shown in FIG. 1. A loading pin 6 which is displaceable to and for is arranged in the longitudinal direction of the conveying duct 2. The loading pin 6 extends through the housing 8 and is connected to a cylinder-piston unit (not shown).

In the illustrated position of the loading pin 6, the loading pin 6 is in contact with its end face on the stud 4. The end face is provided with insulation 7. The loading pin 6 is displaced away from the stud 4 to clear the conveying duct 2 and the supply duct 3. Once a further stud 4 has been conveyed through the supply duct 3 to the conveying duct 2, the loading pin 6 is displaced into the conveying duct 2 where it comes to rest on the stud 4 and conveys the stud 4 to the holding means 1.

Figure 2:
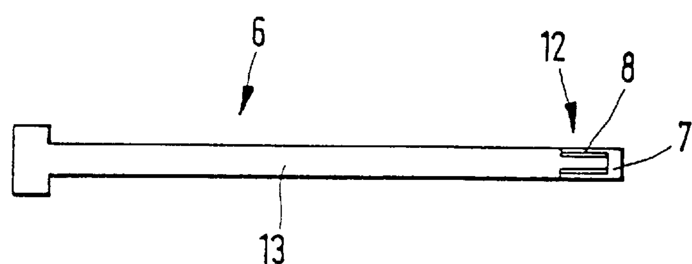
FIG. 2 shows a first embodiment of a loading pin.
Figure 3:
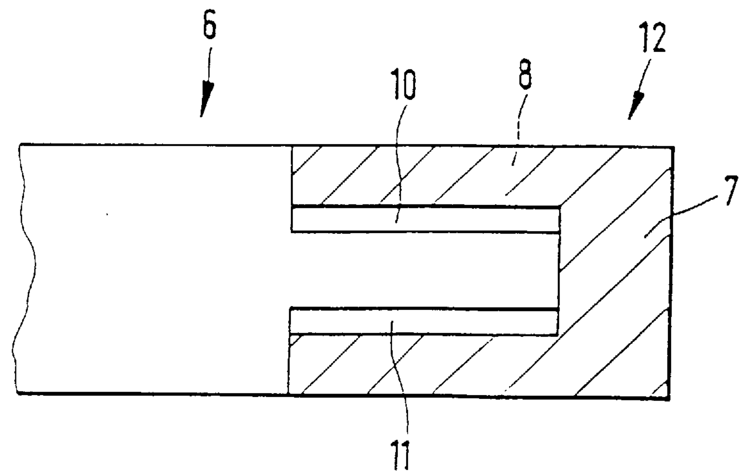
FIG. 3 shows the front head part, comprising insulation, of the loading pin according to FIG. 2 on an enlarged scale.

FIG. 2 shows an embodiment of a loading pin 6. The loading pin 6 has a circular cross section. Other cross sections are also possible. The head part 12 of the loading pin 6 is formed by a cap 8 which forms the insulation 7. The cap 8 has an internal thread 10 by means of which it is screwed onto an external thread 11 formed on the shank part 13 of the loading pin 6. The cap 8 is formed from an electrically insulating material, preferably from plastic material.

Figure 4:
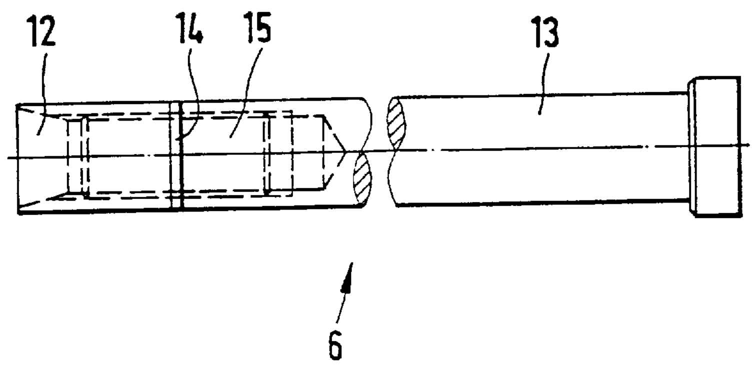
FIG. 4 shows a second embodiment of a loading pin.
Figure 5:
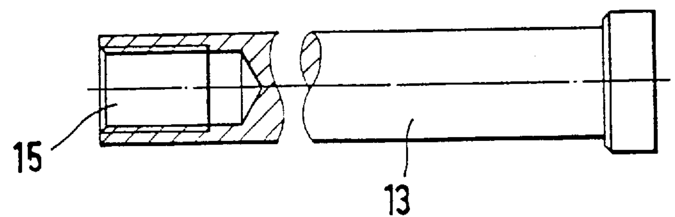
FIG. 5 shows a shank part of a loading pin.
Figure 6:
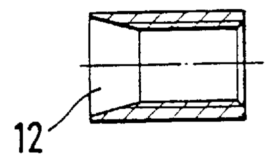
FIG. 6 shows a head part of the loading pin according to FIG. 4.

FIG. 4 shows a second embodiment of a loading pin 6. The loading pin 6 has a shank part 13 which is connected to a head part 13. An intermediate ring 14 is arranged between the shank part 13 and the head part 12. As shown in FIG. 5, the shank part 13 had a threaded bore 15 extending axially from one end. The head part 12 has a corresponding internally threaded bore. A headless screw 15 is provided to connect the head part 12 to the shank part 13. The headless screw 15 is preferably composed of an electrically non-conductive material, in particular of polyamide 6.6 with a glass fiber reinforcement. The headless screw 15 is adhered to the head part 12 to secure it. Corresponding adhesion can also be provided between the headless screw 15 and the shank part 14.

What is claimed is:

1. An electric welding device for welding a weld stud on a workpiece comprising a supply duct connected at one end to said supply duct for receiving the weld stud and for holding the weld stud at its other end during the welding process, a loading pin, said loading pin being reciprocable in the longitudinal direction of said conveying duct and having a shank part and a head part engageable with the weld stud, said head part of said loading pin comprising an electrical insulating surface facing the weld stud to prevent the direct flow of electrical current therebetween.

2. A welding device as claimed in claim 1, wherein said head part is coated with a layer of electrical insulation.

3. A welding device as claimed in claim 1, wherein said head part comprises a cap at least partially surrounding the end of the loading pin.

4. A welding device as claimed in claim 3, wherein said cap is detachably connected to the shank part.

5. A welding device as claimed in claim 4, wherein said cap is screwed to the shank part.

6. A welding device as claimed in claim 4, wherein said cap comprises a plastic material.

7. A welding device as claimed in claim 6, wherein said cap comprises glass fiber-reinforced polyamide.

8. A welding device as claimed in claim 1, wherein said loading pin is entirely composed of an electrically insulating material.

* * * * *